(12) United States Patent
Grisenthwaite et al.

(10) Patent No.: US 10,866,805 B2
(45) Date of Patent: Dec. 15, 2020

(54) SPECULATION BARRIER INSTRUCTION

(71) Applicant: Arm Limited, Cambridge (GB)

(72) Inventors: Richard Roy Grisenthwaite, Cambridge (GB); Giacomo Gabrielli, Cambridge (GB); Matthew James Horsnell, Cambridge (GB)

(73) Assignee: Arm Limited, Cambridge (GB)

( * ) Notice: Subject to any disclaimer, the term of this patent is extended or adjusted under 35 U.S.C. 154(b) by 78 days.

(21) Appl. No.: 16/208,701

(22) Filed: Dec. 4, 2018

(65) Prior Publication Data

US 2019/0205140 A1    Jul. 4, 2019

Related U.S. Application Data

(60) Provisional application No. 62/613,280, filed on Jan. 3, 2018.

(51) Int. Cl.
| | |
|---|---|
| *G06F 9/30* | (2018.01) |
| *G06F 9/38* | (2018.01) |
| *G06F 12/0875* | (2016.01) |
| *G06F 12/14* | (2006.01) |
| *G06F 21/71* | (2013.01) |

(52) U.S. Cl.
CPC ...... *G06F 9/30087* (2013.01); *G06F 9/30058* (2013.01); *G06F 9/3834* (2013.01); *G06F 9/3842* (2013.01); *G06F 12/0875* (2013.01); *G06F 12/1491* (2013.01); *G06F 21/71* (2013.01); *G06F 2212/1052* (2013.01)

(58) Field of Classification Search
CPC ............. G06F 9/30087; G06F 9/3842; G06F 12/0875; G06F 12/1491; G06F 21/71
See application file for complete search history.

(56) References Cited

U.S. PATENT DOCUMENTS

| 6,484,230 B1 | 11/2002 | Konigsburg et al. |
| 2008/0147992 A1 | 6/2008 | Raikin et al. |

OTHER PUBLICATIONS

Bedichek, "Some Efficient Architecture Simulation Techniques", University of Washington, Department of Computer Science, FR-35, Proceedings of the Winter 1990 USENIX Conference, 1990, 12 pages.
International Search Report and Written Opinion of the International Searching Authority for PCT/GB2018/053636 dated Apr. 24, 2019, 18 pages.

*Primary Examiner* — Jyoti Mehta
(74) *Attorney, Agent, or Firm* — Nixon & Vanderhye P.C.

(57) ABSTRACT

An apparatus comprises processing circuitry to perform data processing and instruction decoding circuitry to decode instructions to control the processing circuitry to perform the data processing. The instruction decoding circuitry is responsive to a speculation barrier instruction to control the processing circuitry to prevent a subsequent operation, appearing in program order after the speculation barrier instruction, that has an address dependency on an earlier instruction preceding the speculation barrier instruction in the program order, from speculatively influencing allocations of entries in a cache. This provides protection against speculative cache-timing side-channel attacks.

16 Claims, 5 Drawing Sheets

SPECULATION BARRIER INSTRUCTION

The present application claims priority to U.S. provisional application 62/613,280 filed on Jan. 3, 2018, the contents of which are entirely incorporated herein by reference.

BACKGROUND

Technical Field

The present technique relates to the field of data processing.

Technical Background

A data processing apparatus may support speculative execution of instructions, in which instructions are executed before it is known whether input operands for the instruction are correct or whether the instruction needs to be executed at all. For example, a processing apparatus may have a branch predictor for predicting outcomes of branch instructions so that subsequent instructions can be fetched, decoded and executed speculatively before it is known what the real outcome of the branch should be. Also some systems may support load speculation where the value loaded from memory is predicted before the real value is actually returned from the memory, to allow subsequent instructions to be processed faster. Other forms of speculation are also possible.

SUMMARY

At least some examples provide an apparatus comprising: processing circuitry to perform data processing; instruction decoding circuitry to decode instructions to control the processing circuitry to perform the data processing; and in which: the instruction decoding circuitry is responsive to a speculation barrier instruction to control the processing circuitry to prevent a subsequent operation, appearing in program order after the speculation barrier instruction, that has an address dependency on an earlier instruction preceding the speculation barrier instruction in the program order, from speculatively influencing allocations of entries in a cache.

At least some examples provide a computer program for controlling a host processing apparatus to provide an instruction execution environment for executing instructions of target program code, the computer program comprising: instruction decoding program logic to decode instructions of the target program code to control processing program logic to perform data processing; in which: the instruction decoding program logic is responsive to a speculation barrier instruction to prevent a subsequent operation, appearing in program order after the speculation barrier instruction, that has an address dependency on an earlier instruction preceding the speculation barrier instruction in the program order, from speculatively influencing allocations of entries in a cache.

At least some examples provide a data processing method comprising: decoding a speculation barrier instruction; and in response to decoding of the speculation barrier instruction, controlling the processing circuitry to prevent a subsequent operation, appearing in program order after the speculation barrier instruction, that has an address dependency on an earlier instruction preceding the speculation barrier instruction in the program order, from speculatively influencing allocations of entries in a cache.

At least some examples provide an apparatus comprising: processing circuitry to perform data processing; instruction decoding circuitry to decode instructions to control the processing circuitry to perform the data processing, in which in response to a conditional branch instruction, the instruction decoding circuitry is configured to control the processing circuitry to select one of a first outcome in which the next instruction after the conditional branch instruction is a first instruction, and a second outcome in which the next instruction is a second instruction; and branch prediction circuitry to predict whether the first outcome or the second outcome should be selected for the conditional branch instruction; in which: in response to a one-way-speculation variant of the conditional branch instruction, at least one of the branch prediction circuitry and the instruction decoding circuitry is configured to control the processing circuitry to: apply a restriction on speculative execution for the first instruction when the branch prediction circuitry predicts the first outcome for the one-way-speculation variant of the conditional branch instruction; and omit applying said restriction on speculative execution for the second instruction when the branch prediction circuitry predicts the second outcome for the one-way-speculation variant of the conditional branch instruction.

At least some examples provide a data processing method comprising: in response to a conditional branch instruction, selecting one of a first outcome in which the next instruction after the conditional branch instruction is a first instruction, and a second outcome in which the next instruction is a second instruction; predicting whether the first outcome or the second outcome should be selected for the conditional branch instruction; and when the conditional branch instruction is a one-way-speculation variant of the conditional branch instruction: applying a restriction on speculative execution to the first instruction when the first outcome is predicted for the one-way-speculation variant of the conditional branch instruction; and omitting applying said restriction on speculative execution to the second instruction when the second outcome is predicted for the one-way-speculation variant of the conditional branch instruction.

BRIEF DESCRIPTION OF THE DRAWINGS

Further aspects, features and advantages of the present technique will be apparent from the following description of examples, which is to be read in conjunction with the accompanying drawings.

DESCRIPTION OF EXAMPLES

Figure 1:
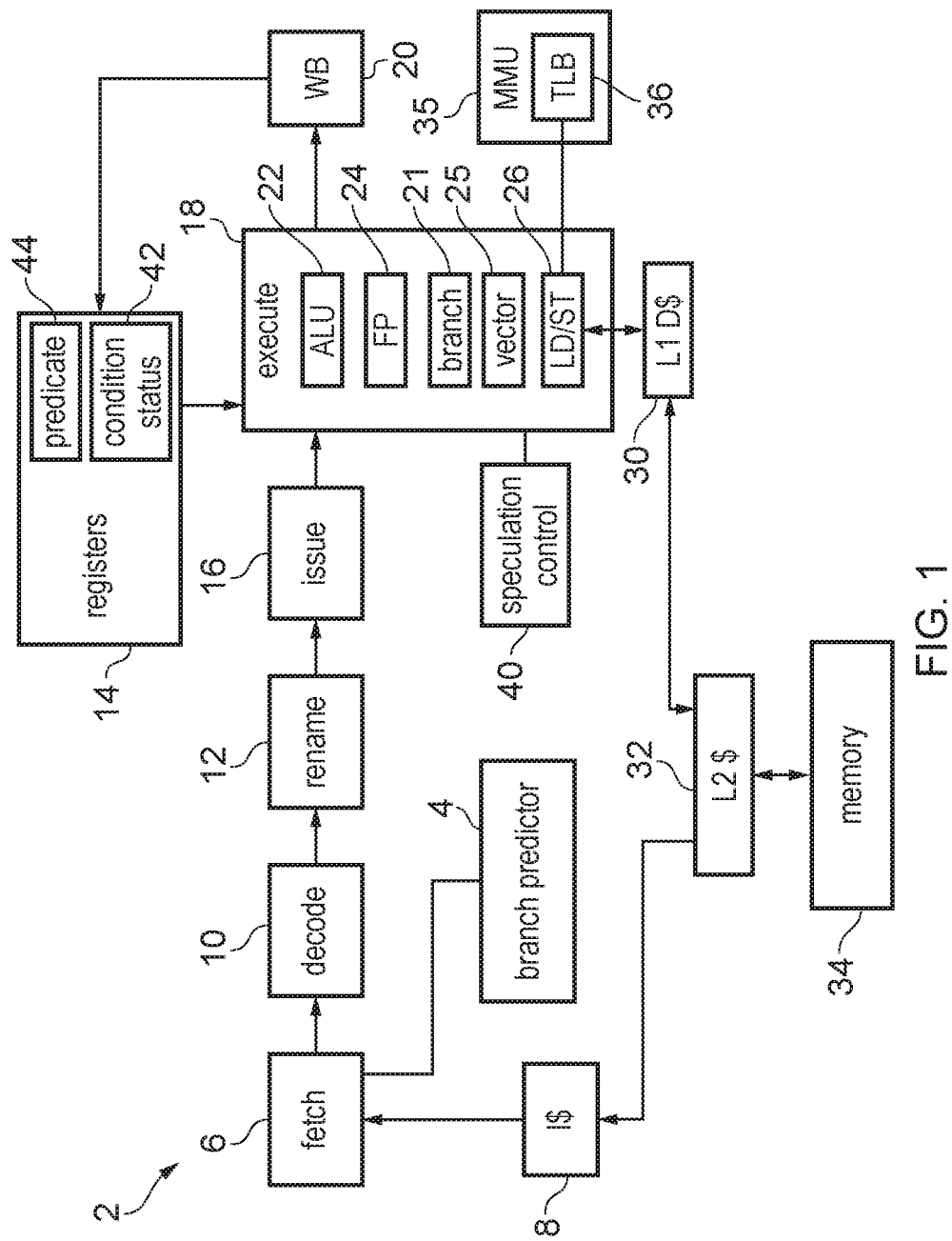
FIG. 1 schematically illustrates an example of a data processing apparatus supporting speculative execution instructions.

A data processing apparatus may have mechanisms for ensuring that some data in memory cannot be accessed by certain processes executing on the processing circuitry. For example privilege-based mechanisms and/or memory protection attributes may be used to control the access to certain regions of memory. Recently, it has been recognised that in systems using speculative execution and caching, there is a potential for a malicious person to gain information from a region of memory that they do not have access to, by exploiting the property that the effects of speculatively executed instructions may persist in a data cache even after any architectural effects of the speculatively executed instructions have been reversed following a misspeculation. Such attacks may train branch predictors or other speculation mechanisms to trick more privileged code into speculatively executing a sequence of instructions designed to make the privileged code access a pattern of memory addresses dependent on sensitive information, so that less privileged code which does not have access to that sensitive information can use cache timing side-channels to probe which addresses have been allocated to, or evicted from, the cache by the more privileged code, to give some information which could allow the sensitive information to be deduced. Such attacks can be referred to as speculative side-channel attacks.

As discussed in more detail below, the instruction decoding circuitry of a data processing apparatus may support a speculation barrier instruction. In response to the speculation barrier instruction, the instruction decoding circuitry may control the processing circuitry to prevent a subsequent operation, which appears in program order after the speculation barrier instruction and has an address dependency on an earlier instruction preceding the speculation barrier instruction in the program order, from speculatively influencing allocations of entries in the cache. This provides protection against the types of attack described above. For example, the programmer of compiler generating code which is allowed to access sensitive information could include the speculation barrier between an earlier load instruction whose address is derived from a value provided by untrusted code, and a later load instruction whose address is calculated based on the value loaded by an earlier load instruction. The inclusion of the barrier may prevent the later load instruction speculatively affecting the allocations of entries in a cache in such a way that cache timing channels could be used to determine information about sensitive information which is not accessible to the untrusted code. Hence, by providing support for the speculation barrier instruction, security can be increased.

The subsequent operation following the speculation barrier instruction, for which speculative influence of allocations of entries in a cache is prevented, may be one of a load instruction and a store instruction. The earlier instruction (on which that load or store instruction has an address dependency) may be a load instruction.

In one example, until the speculation barrier instruction completes:
when a load, store, data or instruction preload RW2 appears in program order after the speculation barrier instruction, that has an address dependency on the result of a conditional select instruction, where:
the conditional select instruction has a register data dependency on a load R1 that has been executed speculatively, for one of its input registers, and
the conditional select instruction does not have a register dependency on R1 for its other input register, and
the condition for the conditional select instruction is such that the input that is not dependent on R1 is selected if R1 is not architecturally executed, then the processing circuitry is configured to prevent RW2 influencing allocations of entries in the cache in a way that can be used to determine any part of the value of a speculatively loaded value from R1 by an evaluation of which entries in the cache have been allocated or evicted. This prevents an attacker being able to derive any information on a value speculatively loaded by load R1 by analysing the effect on the cache of the subsequent operation RW2.

In another example, until the speculation barrier instruction completes:
when a load, store, data or instruction preload RW2 appears in program order after the speculation barrier instruction, that has an address dependency on the result of a conditional move instruction, where:
the conditional move instruction does not have a register dependency on a load R1, that has been executed speculatively, for its input register, and
the condition for the conditional move instruction is such that the condition passes if R1 is not architecturally executed then the processing circuitry is configured to prevent RW2 influencing allocations of entries in the cache in a way that can be used to determine any part of the value of a speculatively loaded value from R1 by an evaluation of which entries in the cache have been allocated or evicted. Again, this prevents an attacker exploiting incorrect speculation of load R1 to gain information on the value loaded by R1 based on analysis of the effect of the subsequent operation RW2 on the cache allocation.

The cache, for which speculative influence of allocations of entries by the subsequent operation following the speculation barrier instruction is prevented, could be any of data cache, and instruction cache and a branch prediction cache. Other examples of the cache could include: a value predictor cache, a load/store aliasing predictor cache, and other predictive structures.

There may be different ways in which the processing circuitry may prevent the subsequent operation following the speculation barrier instruction from speculatively influencing allocations of entries in the cache. In one example, this could be prevented by preventing speculative execution of the subsequent operation, at least until the speculation barrier instruction completes. The speculation barrier instruction may be considered to complete once any preceding instruction in the program order has been resolved. In some examples, once the speculation barrier instruction has completed, speculative execution of subsequent operations could then be allowed (provided that speculation is based on predictions associated with operations which follow the speculation barrier instruction). In other examples, the processing circuitry may prevent the subsequent operation from speculatively influencing allocations of entries in the cache while permitting speculative execution of the subsequent operation. The influence over allocations of entries in the cache could be the allocation of a new entry for a given address which did not previously have an entry allocating the cache, or the eviction of a previously cached entry associated with a given address so that the given address is no longer cached.

For example, rather than preventing the speculative execution itself, the effect of that speculative execution on the cache could be prevented. For example, some implementations could choose to prevent a speculatively executed operation which follows the barrier instruction from caching data at all, if it is executed based on a speculative prediction of an outcome of an instruction preceding the speculation barrier instruction and the speculation barrier instruction has not yet completed.

Alternatively, until the speculation barrier instruction completes any data speculatively loaded by the subsequent operation could be retained in a speculative buffer and not allocated into the main cache, until the speculation has been resolved and the speculation barrier instruction has completed. For example the speculative buffer may be a buffer which may be looked up as an additional cache way alongside any cache way of the main caches, but the contents of the speculation buffer could be discarded on certain transitions of privilege level (e.g. on a transition to a less privileged state) so that less privileged code cannot access the speculatively loaded data when it has not yet been resolved as correct. This approach can prevent the main cache region being polluted with speculatively loaded values (and prevent eviction of other values from the main cache due to allocation of those speculatively loaded values), so that if there is subsequently a transition to a less privileged state, the less privileged code will not be able to use cache timing side channels to deduce any information on the value which was cached.

In one example, in response to the speculation barrier instruction, the instruction decoding circuitry may control the processing circuitry to prevent the subsequent instruction being speculatively executed using at least one of: a data value prediction for the earlier instruction, a condition code prediction for the earlier instruction when the earlier instruction is an instruction other than a conditional branch instruction, and in cases where the earlier instruction is a vector instruction which depends on predicate information indicating which data elements of a vector value are active elements to be processed, a prediction of that predicate information. By preventing subsequent instructions being able to speculatively use the outcome of data value prediction, condition code prediction or predicate prediction made for an instruction preceding the speculation barrier instruction, this can reduce the avenues available for the attacker.

In one example the processing circuitry may permit speculative control of control flow of instructions following the speculation barrier instruction base don a prediction associated with architecturally unresolved earlier instruction preceding the speculation barrier instruction. Hence, control of flow speculation before and after the speculation barrier instruction could still be permitted. Permitting speculative control flow is possible because the suppression of the effects of caching in response to a speculatively executed instruction following the barrier may be enough to mitigate against the attacks discussed above. By enabling speculative control of control flow before and after the barrier, this can improve performance. Similarly, in some examples, speculative execution of conditional instructions following the speculation barrier instruction may be permitted, unless they use the results of a data value prediction or a condition code prediction of an earlier instruction preceding the speculation barrier instruction in programme order at a time when the earlier instruction has not yet been architecturally resolved.

Another form of speculation in some data processing apparatuses may be to speculate on the addresses of load or store instructions. The address of a load or store instruction may depend on an address computation based on a value from a register which may be computed by an earlier instructions. When a store instruction is followed by a load instruction where the address of the load is not yet known, there may be a risk that the address of the load instruction could actually turn out to be the same as the address of the earlier store instruction, although this may be less likely than the case when the address of the load is different to the address of the earlier store. Execution of the store instruction could be delayed due to waiting for results of earlier instructions on which the store value depends. Whether the load actually accesses the same address as the store may not be known until the load instruction is executed. If the processing circuitry waited for the store instruction to complete before issuing the load instruction for execution, this could cause an unnecessary delay in cases when the load address actually turns out to be different from the store address.

Hence, by speculatively issuing the load instruction early (bypassing the earlier store) then in cases when the address of the load instruction actually turn out to be different from the address of the store instruction, this improves performance as the load is not unnecessarily delayed waiting for the value from the earlier store instruction. However, in cases where the load address actually turns out to be the same as the earlier store address, this speculative execution may lead to the wrong value being loaded, as the load instruction may load the out of date value stored at the target address before the store instruction is executed rather than the value resulting from execution the store instruction.

In some scenarios, an attacker could try to exploit this speculative bypassing of an earlier store by a load in an attempt to gain access to sensitive information. A store-speculation barrier instruction may be provided to mitigate against such an attack. In response to a store-speculation barrier instruction, instruction decoding circuitry may prevent an earlier store instruction which precedes the store-speculation barrier instruction in the program order being bypassed by speculative execution of a subsequent load instruction which follows the store-speculation barrier instruction in the program order and specifies the same address as the earlier store instruction. The store-speculation barrier instruction may have a different instruction encoding to the speculation barrier instruction discussed above. Hence, the support for the store-speculation barrier instruction provides increased security.

Different variants of the store-speculation barrier instruction may be provided. For a first variant of the store-speculation barrier instruction, the subsequent load instruction may be one which specifies the same virtual address as the earlier store instruction. For a second variant, the subsequent load instruction may be one which specifies the same physical address as the earlier store instruction. Provision of the second variant can be useful for preventing the speculative loads being exploited using the cache timing side channel mechanism when entering or leaving an operating system, for example.

In response to the store-speculation barrier instruction, the instruction decoding circuitry could also prevent an earlier load instruction which precedes the store-speculation barrier instruction in the program order speculatively loading data resulting from a subsequent store instruction which follows the store-speculation barrier instruction in the programme order and which specifies the same address as the earlier load instruction. This protects against the attacks which may try to exploit the opposite scenario where a store following the speculation barrier instruction is executed ahead of an earlier load, on the assumption that the store will have a different address, but then later turns out to actually store to the same address as the earlier load, in which case the speculative execution of the store could result in the wrong value being loaded by the earlier load. The store-speculation barrier instruction can avoid the attacker being able to use cache timing side channels to probe changes in cache allocation caused by such incorrect speculation, and hence improves security.

One type of instruction which may cause speculative execution may be a conditional branch instruction, in response to which the instruction decoder may control the processing circuitry to select either a first outcome in which a first instruction is selected as the next instruction after the conditional branch instruction, or a second outcome in which a second instruction is selected as the next instruction after the conditional branch instruction. For example, one of the first and second outcomes may be a taken outcome and the other may be a not-taken outcome for the conditional branch instruction. Branch prediction circuitry may be provided to predict whether the first or second outcome should be selected for the conditional branch instruction, before the actual outcome is known. Subsequent instructions can then be speculatively executed based on the branch prediction.

In one example, a one-way-speculation variant of the conditional branch instruction may be provided, in response to which at least one of the branch prediction circuitry and the instruction decoding circuitry may control the processing circuitry to apply a restriction on speculative execution for the first instruction when the branch prediction circuitry predicts the first outcome for the one-way-speculation variant of the conditional branch instruction, while the restriction on speculative execution may be omitted for the second instruction in cases where the branch prediction circuitry predicts the second outcome for the one-way-speculation variant of the conditional branch instruction.

Hence, speculative execution may be more restricted when the branch predictor predicts one outcome than when it predicts the other outcome for the conditional branch. This can be useful to protect against speculation-based cache-timing side-channel attacks of the type discussed above. For example, where the conditional branch checks whether a value passed to it from potentially untrusted code is within an allowable range, or checks whether a password provided by potentially untrusted code is correct, one of the taken and not-taken outcomes may be designed to continue with the processing of potentially sensitive information, while the other outcome may not be at risk of accessing that sensitive information. Hence, typically it may be known by the programmer or compiler which of the outcomes of the conditional branch may be more at risk of attack than the other. By providing a one-way-speculation variant of the conditional branch instruction, following which speculative execution is less restricted for one predicted branch outcome than for the other, this can allow the processor to improve performance by permitting speculative execution when the second outcome is predicted but increase security by restricting speculative execution when the first outcome is predicted.

There may be a number of ways to restrict speculative execution in cases where the first outcome is predicted for the conditional branch. In one example speculative execution of a given instruction following the conditional branch could be prevented at all (at least until the prediction has been resolved as correct). Alternatively, the restriction in speculation could still allow the subsequent instructions to be speculatively executed, but may involve a restriction in caching applied to a subsequent instruction following the branch (again, at least until the prediction has been resolved as correct). For example, caching may either be prohibited in response to an instruction executed speculatively following the prediction of the first outcome for the conditional branch, or caching could be enabled but into a separate speculative buffer separate from the main cache as in the example discussed above.

In general, the one-way-speculation variant of the conditional branch instruction may be distinguished from a conventional two-way-speculation variant of a conditional branch instruction (for which speculative execution is unrestricted regardless of which the first or second outcomes is predicted by the branch predictor) in a number of ways. In one example, the one-way-speculation variant may have a different instruction encoding (e.g. a different instruction opcode, or a field within the instruction encoding which distinguishes the different variants). Alternatively, the one-way and two-way speculation variants of the conditional branch instruction could have the same encoding, but a control parameter stored in a control register of the data processing apparatus may specify which variant is to be used when such a conditional branch instruction is encountered.

Also there may be a number of alternative variants of the one-way-speculation variant itself. For example, for a first variant, the first outcome may comprise the taken outcome and the second outcome may comprise the not-taken outcome. For a second variant, the first and second outcomes may be the other way round, so the first outcome may comprise the not-taken outcome while the second outcome may comprise the second outcome. Again, these variants could be distinguished by different instruction encodings or by a parameter in a control register. Hence, by providing different variants where the restriction on speculative execution may be applied either for the taken outcome in the case of the first variant or for the not-taken outcome in the case of the second variant, this provides flexibility for the programmer or the compiler to select which variant to use depending on whether the taken or not-taken outcome is more vulnerable to an attack by speculative cache timing side-channels.

There may be a number of ways in which the microarchitecture of the processing apparatus may ensure that the restriction in speculative execution is applied when the first outcome is predicted for the one-way-speculation variant of the conditional branch instruction, but not when the second outcome is predicted.

In one example, the branch prediction circuitry may make its prediction based on branch prediction state information trained based on outcomes of previous conditional branch instructions, and may exclude the one-way speculation variant of the conditional branch instruction from the training of the branch prediction state information. By excluding the one-way variant from the training of branch prediction state, this prevents the branch predictor learning the actual outcome of the one-way variant, so that the predictions for the one-way variant could be biased towards the second outcome for which speculation is less restricted, e.g. by not including any stored branch prediction state for the one-way variant or by including an entry of branch prediction state which defaults to predict the second outcome for the one-way branch without being trained based on actual branch outcomes.

For example, in some branch predictors the prediction may default to the not-taken outcome for any instruction for which there is no stored branch prediction state. In this case, for the first variant of the one-way-speculation conditional branch instruction (where the first outcome is taken and the second outcome is not-taken), it may be possible to not allocate any branch prediction state information for the one-way-speculation branch, as the branch predictor may default to predicting the second outcome (not-taken) for any instruction for which there is no stored branch prediction state, to ensure it is not possible to speculatively execute instructions based on the first outcome. In contrast, for the second variant (for which the first outcome for which speculation is to be restricted is to be the not-taken outcome), an entry could be allocated in the branch prediction circuitry specifying as a default prediction the second (taken) outcome, which will then continue to predict the second outcome even if actual branch outcomes for the one-way branch are the first outcome (as there is no training based on actual results of the one-way branch), to ensure that there can be no speculation based on the first outcome.

Another way of restricting speculation for the first outcome of the one-way-speculation variant of the conditional branch instruction in the microarchitecture may be that the branch predictor may still train its branch prediction state information based on the actual outcome of the one-way-speculation variant of the conditional branch instruction, in a similar manner to conditional branches for which there is no one-way speculation control, but then based on which prediction is output by the branch predictor, the processing pipeline may then control whether speculation is allowed or whether, if speculation is allowed, there should be a restriction on caching. Hence, with this micro-architectural approach, the branch predictor may train its branch prediction state based on the one-way-speculation variant similar to other two-way-speculated conditional branches, but a filtering of whether or not to speculate can be applied based on which outcome is predicted for the one-way-speculation variant.

It will be appreciated that both of these micro-architectural approaches are within the architectural definition of the one-way-speculative variant of the conditional branch instruction, for which a restriction in speculation is applied when the first outcome is predicted but omitted when the second outcome is predicted.

In addition, in some examples the instruction decoder may also support a speculation-restricted variant of the conditional branch instruction, for which the restriction on speculative execution is applied to the next instruction following the branch regardless of whether the first or second outcome is selected by the branch prediction circuitry. This could be useful for cases where both branches of the program flow are deemed at risk of potential speculation-based cache timing side-channel attacks, so for this particular branch the pipeline does not act speculatively on a prediction made for that instruction, or alternatively if speculative execution is permitted then regardless of whether the speculation was based on the first or the second outcome the effects of caching of such state executed instructions could be restricted until the condition associated with the conditional branch instruction has been resolved.

Hence the techniques discussed above help to provide robustness against potential side channel attacks.

FIG. 1 schematically illustrates an example of a data processing apparatus 2 having a processing pipeline comprising a number of pipeline stages. The pipeline includes a branch predictor 4 for predicting outcomes of branch instructions. A fetch stage 6 generates a series of fetch addresses based on the predictions made by the branch predictor 4. The fetch stage 6 fetches the instructions identified by the fetch addresses from an instruction cache 8. A decode stage 10 decodes the fetched instructions to generate control information for controlling the subsequent stages of the pipeline. A rename stage 12 performs register renaming to map architectural register specifiers identified by the instructions to physical register specifiers identifying registers 14 provided in hardware. Register renaming can be useful for supporting out-of-order execution as this can allow hazards between instructions specifying the same architectural register to be eliminated by mapping them to different physical registers in the hardware register file, to increase the likelihood that the instructions can be executed in a different order from their program order in which they were fetched from the cache 8, which can improve performance by allowing a later instruction to execute while an earlier instruction is waiting for an operand to become available. The ability to map architectural registers to different physical registers can also facilitate the rolling back of architectural state in the event of a branch misprediction. An issue stage 16 queues instructions awaiting execution until the required operands for processing those instructions are available in the registers 14. An execute stage 18 executes the instructions to carry out corresponding processing operations. A writeback stage 20 writes results of the executed instructions back to the registers 14.

The execute stage 18 may include a number of execution units such as a branch unit 21 for evaluating whether branch instructions have been correctly predicted, an ALU (arithmetic logic unit) 22 for performing arithmetic or logical operations, a floating-point unit 24 for performing operations using floating-point operands, a vector processing unit 25 for processing vector operations where multiple independent data elements are processed in response to a single instruction, and a load/store unit 26 for performing load operations to load data from a memory system to the registers 14 or store operations to store data from the registers 14 to the memory system. In this example the memory system includes a level one instruction cache 8, a level one data cache 30, a level two cache 32 which is shared between data and instructions, and main memory 34, but it will be appreciated that this is just one example of a possible memory hierarchy and other implementations can have further levels of cache or a different arrangement. Access to memory may be controlled using a memory management unit (MMU) 35 for controlling address translation and/or memory protection. The load/store unit 26 may use a translation lookaside buffer (TLB) 36 of the MMU 35 to map virtual addresses generated by the pipeline to physical addresses identifying locations within the memory system. It will be appreciated that the pipeline shown in FIG. 1 is just one example and other examples may have different sets of pipeline stages or execution units. For example, an in-order processor may not have a rename stage 12.

The branch predictor 4 is one example of a speculation mechanism which may be used by the data processing apparatus to speculatively perform data processing operations before it is known whether they are really required, based on a prediction of a branch outcome for a conditional branch instruction and/or a prediction of a target address for an indirect branch instruction. There may also be speculation control circuitry 40 associated with the execute unit 18 for controlling the execute stage to speculatively execute instructions based on a prediction (other than the branch prediction) of information associated with that instruction.

For example, a conditional instruction may control the execute stage 18 to perform a conditional processing operation, conditional on the values of condition status codes 42 which are stored in the registers 14. Some condition-setting instructions may cause the condition status codes 42 to be updated based on the result of the instruction. For example, an arithmetic instruction processed by the ALU 22 could cause the condition codes 42 to be updated to indicate a property of the result, such as: whether the result of an arithmetic operation was zero; whether the result was negative, or whether the operation generated a signed overflow or unsigned overflow. Subsequent conditional instructions may then test whether the current values of the condition status codes 42 meet some test condition. From an architectural point of view, if the codes do meet the test condition then an associated processing operation (such as an arithmetic or logical operation) may be performed, while if the condition status codes 42 do not meet the test condition then that conditional operation may not be performed and instead the instruction may be treated as a no-operation instruction which has no architectural effect. However, in the microarchitecture the speculation control circuitry 40 may speculatively execute the processing operations associated with the conditional instruction based on a prediction of the condition status codes 42, before the actual condition codes are known, to avoid waiting for earlier instructions to complete which may change the condition codes. If the prediction turns out to be incorrect, then the results of the speculatively executed instructions can be discarded and program flow can be rewound to the last correct point of execution.

Another form of speculation which could be performed by the speculation control circuitry 40 could be prediction of a predicate value 44 associated with a vector introduction executed by the vector processing unit 25. A vector instruction, also known as a SIMD (single instruction multiple data) instruction, may operate on multiple data elements stored within the same register. For example a vector add instruction may trigger the vector processing unit to perform multiple add operations, each of those add operations adding a respective pair of data elements at corresponding positions of two vector registers, to produce a corresponding result element which is to be written to a result vector register. This allows a number of independent additions to be carried out in response to one instruction. Vector instructions can be useful for allowing a scalar loop of processing instructions to be processed faster by allowing multiple iterations of the scalar loop to be processed in response to a single iteration of a vectorised loop of instructions including vector instructions to be executed by the vector processing unit 25.

Within a vectorised sequence of instructions, it could be desirable to include conditional functionality, so that if one element of the vector does not meet certain conditions, subsequent operations which would otherwise be performed on that element are not carried out, while other elements within the same vector may still be processed if they do meet the required condition. Also, when vectorising scalar loops, the number of iterations of the scalar loop may not map to an exact multiple of the number of elements provided in the vector, in which case there may be a loop tail iteration where some elements of the vector may not need to be processed, as there are not enough scalar iterations to fully populate the vector in the last vector loop iteration. Hence it can be useful to define a predicate value 44 which specifies which elements of a vector are active elements. Inactive elements of the result vector may be cleared to zero or could retain the previous value which was stored in those portions of the destination register prior to executing the instruction.

Hence, the predicate value 44 may need to be known before the outcome of the corresponding vector instruction can be determined. The predicate value 44 could be set by earlier instructions, e.g. conditional instructions that are waiting on the outcome of other instructions. Waiting for the predicate to actually be calculated may delay the vector instruction. If there is a prediction that can be made for the value of the predicate (e.g. based on previous instances of executing the same instructions, or on a default assumption that all elements are active), then the vector instruction can be executed speculatively to improve performance in the cases where the prediction is correct. If the prediction of the predicate later turns out to be incorrect then the processing can be rewound to an earlier point of execution discarding the results of any incorrectly speculated instructions. Hence, another form of speculation control may be to execute vector instructions speculatively based on a prediction of the predicate value 44.

Another form of speculation could be on the addresses of load or store instructions executed by the load/store unit. For example, where a load instruction follows an earlier store instruction or a store instruction follows an earlier load instruction, then the second instruction could be speculatively executed ahead of the first on the assumption that they will actually access different data values and so are independent, to improve performance in the case where the addresses do turn out to be different. However, if the speculation turns out to be incorrect and the second of the pair of instructions actually ends up accessing the same address as the first, then the speculation may be incorrect, which could result in one of the instructions providing the incorrect result. If a misspeculation is detected, processing can be rewound to an earlier point of execution.

Such speculation mechanisms could potentially be exploited by an attacker to gain access to sensitive information which the attacker should not be allowed to access. The processing apparatus may operate using a privilege based mechanism, in which the MMU 35 may define access permissions restricting access to particular regions of a memory address space to code executed at a given privilege level or higher. An attacker in control of unprivileged code could try to exploit cache timing side-channels to gain access to information on sensitive information in a privileged region of memory which the attacker does not have access to.

The basic principle behind cache timing side-channels is that the pattern of allocations into the cache, and, in particular, which cache sets have been used for the allocation, can be determined by measuring the time taken to access entries that were previously in the cache, or by measuring the time to access the entries that have been allocated. This then can be used to determine which addresses have been allocated into the cache.

The novelty of speculation-based cache timing side-channels is their use of speculative memory reads. Speculative memory reads are typical of advanced micro-processors and part of the overall functionality which enables very high performance. By performing speculative memory reads to cacheable locations beyond an architecturally unresolved branch (or other change in program flow), and, further, the result of those reads can themselves be used to form the addresses of further speculative memory reads. These speculative reads cause allocations of entries into the cache whose addresses are indicative of the values of the first speculative read. This becomes an exploitable side-channel if untrusted code is able to control the speculation in such a way it causes a first speculative read of location which would not otherwise be accessible at that untrusted code. But the effects of the second speculative allocation within the caches can be measured by that untrusted code.

For any form of supervisory software, it is common for untrusted software to pass a data value to be used as an offset into an array or similar structure that will be accessed by the trusted software. For example, an application (untrusted) may ask for information about an open file, based on the file descriptor ID. Of course, the supervisory software will check that the offset is within a suitable range before its use, so the software for such a paradigm could be written in the form:

```
1   struct array {
2       unsigned long length;
3       unsigned char data[ ];
4   };
5   struct array *arr = ...;
6   unsigned long untrusted_offset_from_user = ...;
7   if (untrusted_offset_from_user < arr->length) {
8       unsigned char value;
9       value =arr->data[untrusted_offset_from_user];
10      ...
11  }
```

In a modern micro-processor, the processor implementation commonly might perform the data access (implied by line 9 in the code above) speculatively to establish value before executing the branch that is associated with the untrusted_offset_from_user range check (implied by line 7). A processor running this code at a supervisory level (such as an OS Kernel or Hypervisor) can speculatively load from anywhere in Normal memory accessible to that supervisory level, determined by an out-of-range value for the untrusted_offset_from_user passed by the untrusted software. This is not a problem architecturally, as if the speculation is incorrect, then the value loaded will be discarded by the hardware.

However, advanced processors can use the values that have been speculatively loaded for further speculation. It is this further speculation that is exploited by the speculation-based cache timing side-channels. For example, the previous example might be extended to be of the following form:

```
1 struct array {
2   unsigned long length;
3   unsigned char data[ ];
4 };
5 struct array *arr1 = ...; /* small array */
6 struct array *arr2 = ...; /*array of size 0x400 */
7 unsigned long untrusted_offset_from_user = ...;
8   if (untrusted_offset_from_user < arr1->length) {
9       unsigned char value;
10      value =arr1->data[untrusted_offset_from_user];
11      unsigned long index2 = ((value&1)*0x100)+0x200;
12      if (index2 < arr2->length) {
13          unsigned char value2 = arr2->data[index2];
14      }
15 }
```

In this example, value, which is loaded from memory using an address calculated from arr1->data combined with the untrusted_offset_from_user (line 10), is then used as the basis of a further memory access (line 13). Therefore, the speculative load of value2 comes from an address that is derived from the data speculatively loaded for value. If the speculative load of value2 by the processor cause an allocation into the cache, then part of the address of that load can be inferred using standard cache timing side-channels. Since that address depends on data in value, then part of the data of value can be inferred using the side-channel. By applying this approach to different bits of value, (in a number of speculative executions) the entirety of the data of value can be determined.

Figure 2:
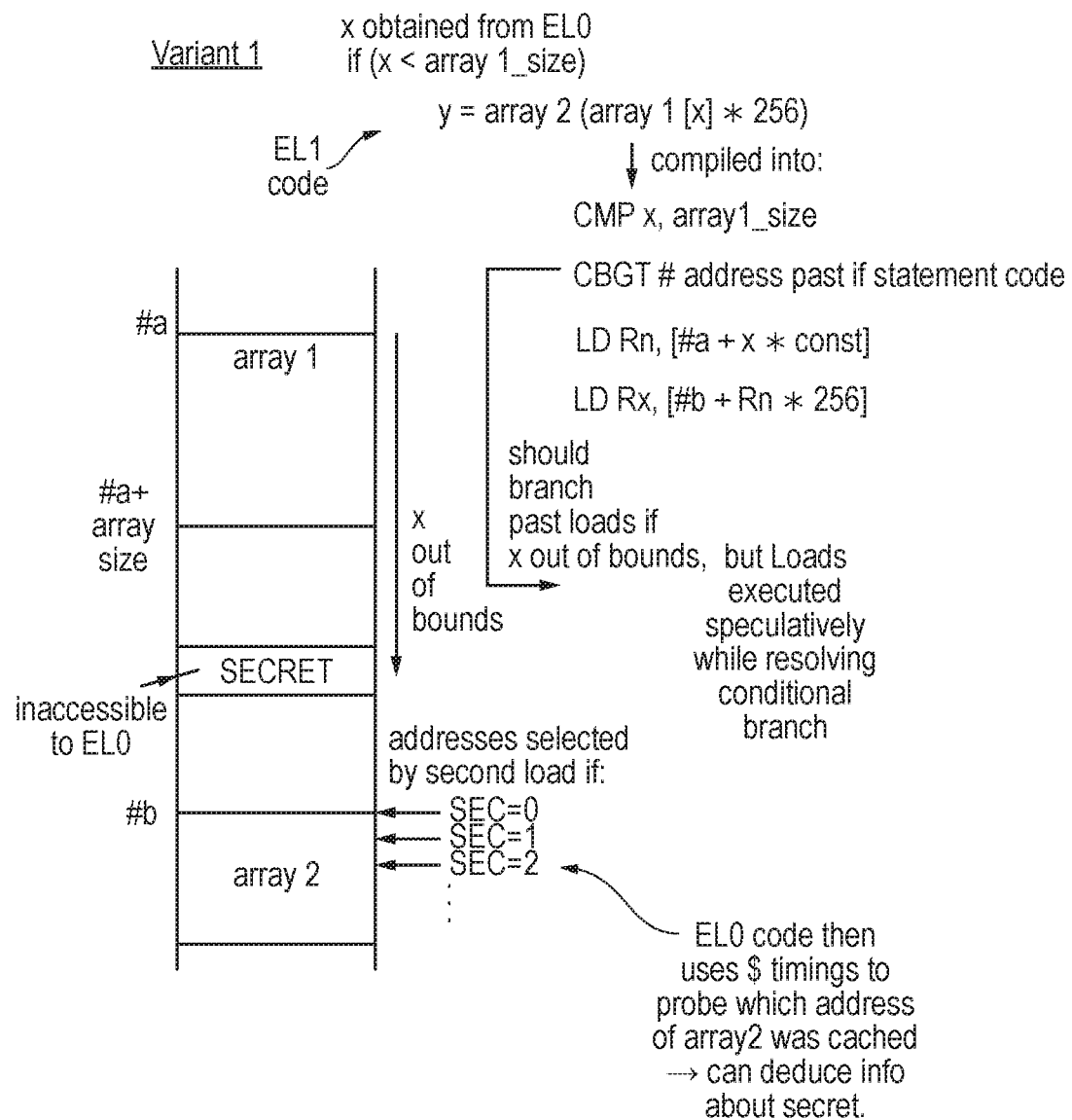
FIG. 2 schematically illustrates an example of a potential attack based on speculation-based cache based timing side-channels.

FIG. 2 shows a diagram illustrating this type of attack pictorially. In the example of FIG. 2 the variable x, corresponds to untrusted_offset_from_user described above, which is obtained from untrusted code operating at a lower privilege level EL0. Variable y corresponds to value in the example above, which is loaded by code operating at a higher privilege level EL1 which is allowed to access secret information which is not accessible to EL0 but which the attacker wishes to gain access to. Variable x is compared with a size parameter indicating the size of array 1, and a conditional branch will branch past the subsequent load instructions LD (corresponding to the loads at lines 10 and 13 respectively in the example above) if the untrusted parameter is greater than the array size. However, these loads may be speculatively executed assuming that the conditional branch will determine a not-taken outcome, even if subsequently it is determined that the untrusted variable x was out of range. This may allow a load to an out-of-bounds address # a+x to load secret information which the attacker should not have access to, if the attacker has chosen "x" in such a way to make # a+x map onto the address of the secret. The second load may then load a value from a second array, array 2, at an address selected based on part of the secret. This second load may cause a change in cache allocation which can then be exploited by less privileged code operating at the lower privilege level (EL0), which may use cache timing analysis to probe which particular address of the second array was cached and hence deduce information about the secret.)

Hence, the untrusted software can, by providing out-of-range quantities for untrusted_offset_from_user (x), access anywhere accessible to the supervisory software, and as such, this approach can be used by untrusted software to recover the value of any memory accessible by the supervisory software.

Modern processors have multiple different types of caching, including instruction caches, data caches and branch prediction cache. Where the allocation of entries in these caches is determined by the value of any part of some data that has been loaded based on untrusted input, then in principle this side channel could be stimulated.

As a generalization of this mechanism, it should be appreciated that the underlying hardware techniques mean that code past a branch might be speculatively executed, and so any sequence accessing memory after a branch may be executed speculatively. In such speculation, where one value speculatively loaded is then used to construct an address for a second load or indirect branch that can also be performed speculatively, that second load or indirect branch can leave an indication of the value loaded by the first speculative load in a way that could be read using a timing analysis of the cache by code that would otherwise not be able to read that value. This generalization implies that many code sequences commonly generated will leak information into the pattern of cache allocations that could be read by other, less privileged software. The most severe form of this issue is that described earlier in this section, where the less privileged software is able to select what values are leaked in this way.

This side-channel has been demonstrated on several processors using code that is run in kernel space using the eBPF bytecode interpreter or JIT engine contained in the Linux kernel. The code run in this way holds a routine to perform the necessary shifting and dereferencing of the speculatively loaded data. The use of this mechanism has avoided the need to search for suitable routines in kernel space that can be directly exploited.

It should be appreciated that this is one example way of exploiting the speculation. Analysis of code has shown that there are a small number of places where the value loaded using an untrusted offset is itself used to form an address to the extent that meaningful amounts of information can be retrieved using this mechanism.

It is common for processors to speculate past an unresolved branch, and as such this behavior is likely to be observed on cached processors which perform execution out of order. For some processors that perform their execution in-order, there may be insufficient speculative execution to allow this approach to be used to cause the necessary allocations into the cache.

The practical software mitigation for the scenario where the value being leaked is determined by less privileged software is to ensure that the address derived from the secret (that is the address that will be used to load value2 in the example above) is only indicative of the secret (the data in value) when the access that derived the secret was one that would be executed non-speculatively.

This can be achieved on some implementations by using a conditional selection or conditional move instruction based on the condition that is used to determine the outcome of the branch (that is, in the previous example, to sanitize the untrusted_offset_from_user). In implementations where this does not work, a new barrier, [defined below] can be used (this instruction is a NOP on implementations where the conditional select/conditional move can be used). The combination of both a conditional select/conditional move and the new barrier are therefore sufficient to address this problem. The details of the new barrier are described later in this section.

It is generally unusual for sequences that allow exploitation of this side-channel to exist in privileged code. However, the compilation of byte-code supplied by a lower level of privilege is an avenue to inject such sequences into privileged software. It is particularly important that just-in-time compilers that compile such byte-code use these mechanisms as part of their compiled sequences. The provision of code injection mechanisms of this type (for example eBPF) may also be disabled in systems where that is practical.

Another area that could be subject to this issue is where there are software-enforced privilege boundaries within a single exception level, as may occur with Javascript interpreters or Java runtimes. For example, in an interpreter, a key element of the software enforcement of privilege involves the sort of sanitization of untrusted values seen in this example, so potentially giving examples of this mechanism. Similarly, the sequences generated by a run-time compilation of Java byte-code may need to incorporate the work-around in their generated sequences.

Where it is impractical to insert this barrier, an alternative approach of inserting the combination of an DSB SYS and an ISB can be inserted to prevent speculation, but this is likely to have a much greater performance effect than using the conditional select/conditional move and CSDB barrier.

A First Example of the New Barrier

CSDB is the new conditional speculation barrier.
Until the barrier completes:
1) For any load, store, data or instruction preload, RW2, appearing in program order after the barrier, that has an address dependency on the result of a conditional select instruction, where:
  i. the conditional select instruction has a register data dependency on a load R1, that has been executed speculatively, for one of its input registers, and
  ii. the conditional select instruction does not have a register dependency on R1 for its other input register, and
  iii. the condition for the conditional select instruction is such that the input that is not dependent on R1 is selected if R1 is not architecturally executed,
   then the speculative execution of RW2 does not influence the allocations of entries in a cache in a way that can be used to determine any part of the value of the speculatively loaded data value from R1 by an evaluation of which entries in the cache have been allocated or evicted.
2) For any indirect branch (B2), appearing in program order after the barrier, whose target address has a register dependency on the result of a conditional select instruction. where:
  i. the conditional select instruction has a register data dependency on a load R1, that has been executed speculatively, for one of its input registers, and
  ii. the conditional select instruction does not have a register dependency on R1 for its other input register, and
  iii. the condition for the conditional select instruction is such that the input that is not dependent on R1 is selected if R1 is not architecturally executed
   then the speculative execution of B2 does not influence the allocations of entries in a cache in a way that can be used to determine any part of the value of the speculatively loaded data value from R1 by an evaluation of which entries in the cache have been allocated or evicted.

The barrier cannot be executed speculatively, but otherwise can complete once it is known not to be speculative.

A Second Example of the New Barrier

CSDB is the new conditional speculation barrier.
Until the barrier completes:
1. For any load, store, data or instruction preload, RW2, appearing in program order after the barrier, that has an address dependency on the result of a conditional move instruction, where
  i. the conditional move instruction does not have a register dependency on a load R1, that has been executed speculatively, for its input register, and
  ii. the condition for the conditional move instruction is such that the condition passes if R1 is not architecturally executed
   then the speculative execution of RW2 does not influence the allocations of entries in a cache in a way that can be used to determine any part of the value of the speculatively loaded data value from R1 by an evaluation of which entries in the cache have been allocated or evicted.
2. For any indirect branch (B2), appearing in program order after the barrier, whose target address has a register dependency on the result of a conditional move instruction where:
  i. the conditional move instruction does not have a register dependency on a load R1, that has been executed speculatively, for its input register, and
  ii. the condition for the conditional move instruction is such that the input that is not dependent on R1 is selected if R1 is not architecturally executed
   then the speculative execution of B2 does not influence the allocations of entries in a cache in a way that can be used to determine any part of the value of the speculatively loaded data value from R1 by an evaluation of which entries in the cache have been allocated or evicted.

The barrier cannot be executed speculatively, but otherwise can complete once it is known not to be speculative.

Use of the Barrier

These examples show how the barrier may be used in the assembly code executed on the processor.

Taking the example shown previously:

```
struct array {
    unsigned long length;
    unsigned char data[ ];
};
struct array *arr1 = ...; /* small array */
struct array *arr2 = ...; /* array of size 0x400 */
unsigned long untrusted_offset_from_user = ...;
if (untrusted_offset_from_user < arr1->length) {
    unsigned char value;
    value = arr1->data[untrusted_offset_from_user];
    unsigned long index2 = ((value&1)*0x100)+0x200;
    if (index2 < arr2->length) {
        unsigned char value2 = arr2->data[index2];
    }
}
```

In a first example, this may be compiled into assembly of the following form:

```
LDR  X1, [X2] ; X2 is a pointer to arr1->length
CMP  X0, X1  ; X0 holds untrusted_offset_from_user
BGE  out_of_range
LDRB W4, [X5,X1] ; X5 holds arr1->data base
AND  X4, X4, #1
LSL  X4, X4, #8
ADD  X4, X4, #0x200
CMP  X4, X6  ; X6 holds arr2->length
BGE  out_of_range
LDRB X7, [X8, X4] ; X8 holds arr2->data base
out_of_range
```

The side-channel can be mitigated in this case by changing this code to be:

```
LDR  X1, [X2] ; X2 is a pointer to arr1->length
CMP  X0, X1  ; X0 holds untrusted_offset_from_user
BGE  out_of_range
LDRB W4, [X5,X1] ; X5 holds arr1->data base
CSEL X4, XZR, X4, GE
CSDB ; this is the new barrier
AND  X4, X4, #1
LSL  X4, X4, #8
ADD  X4, X4, #0x200
CMP  X4, X6  ; X6 holds arr2->length
BGE  out_of_range
LDRB X7, [X8, X4] ; X8 holds arr2->data base
out_of_range
```

In a second example, the equivalent code is as follows:
Original Code:

```
LDR  R1, [R2] ; R2 is a pointer to arr1->length
CMP  R0, R1  ; R0 holds untrusted_offset_from_user
BGE  out_of_range
LDRB R4, [R5,R1] ; R5 holds arr1->data base
AND  R4, R4, #1
LSL  R4, R4, #8
ADD  R4, R4, #0x200
CMP  R4, R6  ; R6 holds arr2->length
BGE  out_of_range
```

-continued
```
LDRB R7, [R8, R4]; R8 holds arr2->data base
out_of_range
```

Code with the Mitigation Added:

```
LDR  R1, [R2] ; R2 is a pointer to arr1->length
CMP  R0, R1  ; R0 holds untrusted_offset_from_user
BGE  out_of_range
LDRB R4, [R5,R1] ; R5 holds arr1->data base
MOVGE R4, #0
CSDB
AND  R4, R4, #1
LSL  R4, R4, #8
ADD  R4, R4, #0x200
CMP  R4, R6  ; R6 holds arr2->length
BGE  out_of_range
LDRB R7, [R8, R4]; R8 holds arr2->data base
out_of_range
```

In order to prevent this side-channel from being created in data caches, instruction caches or branch prediction caches, this mitigation approach can be used when:

A data address is determined from a value read from an untrusted offset

An indirect branch destination is determined from a value read from an untrusted offset A branch decision is determined from a value read from an untrusted offset When applied to a particular code sequence involving the use of an untrusted value, this mitigation will prevent that code sequence from being able to be used to exploit this side-channel to access any data.

For some, but not all, implementations, mapping particularly important secrets, such as Cryptographic keys, in Device memory will prevent their being allocated into a cache. Mapping such data in this way, where it is feasible under the operating system, could be used as an additional safeguard for those implementations, albeit at significantly increased performance cost.

Figure 3:
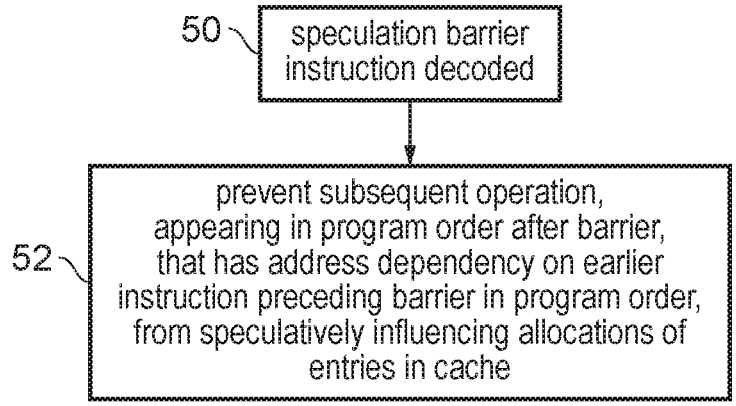
FIG. 3 shows a method of processing a speculation barrier instruction.

Hence, as shown in FIG. 3, a method may be provided of processing a speculation barrier instruction. At step 50, the speculation barrier instruction is decoded. In response, at step 52 the instruction decoder 10 controls the remaining stages of the pipeline to prevent a subsequent operation which appears in program order after the conditional barrier instruction CSDB, where the subsequent operation has an address dependency on an earlier instruction preceding the barrier in the program order, from speculatively influencing allocations of entries in a cache (this cache could be the data cache 30, instruction cache 8, branch prediction cache within the branch predictor 4, or other cache such as value predictor caches or load/store aliasing predictor for example). The preventing of speculative influence over cache allocations could be carried out either by preventing speculative execution of the subsequent instruction at all, or by allowing speculative execution but preventing this from updating the cache or allocating any cached entries into a separate speculative region of the cache which can be erased if there is a reduction in the privilege level for example (data may be transferred from the speculative region into the main region when the speculation has been resolved as correct). The restriction on the speculative effects on the cache for the subsequent instructions following the barrier may last until the barrier is complete, that is until any speculation associated with earlier instructions preceding the barrier has been resolved.

Another example of the speculation barrier instruction CSDB is described below. The semantics of the barrier are that no instruction, other than a branch instruction, appearing in program order after the CSDB can be speculatively executed using the results of any:
- data value predictions of any instructions, or
- predictions of the condition codes 42 for any instructions other than conditional branch instructions, or
- predictions of vector predication state 44 for vector instructions appearing in program order before the CDSB that have not been architecturally resolved.

For purposes of the definition of CSDB, the condition codes 42 and vector predicate values 44 are not considered a data value.

This definition permits: control flow speculation before and after the CSDB, and speculative execution of conditional data processing instructions after the CSDB, unless they use the results of data value or condition code predictions of instructions appearing in program order before the CSDB that have not been architecturally resolved. The code examples described above can also be used with this example of the barrier instruction.

Another example of speculation is the speculation on whether a load instruction and a store instruction (occurring in either order within the program order) will access the same address. In many modern high-performance processors, a performance optimization is made whereby a load to an address will speculatively bypass an earlier store whose target address is not yet known by the hardware, but is actually the same as the address of the load. When this happens, the load will speculatively read an earlier value of the data at that address than the value written by the store. That speculatively loaded value can then be used for subsequent speculative memory accesses that will cause allocations into the cache, and the timing of those allocations can be used as an observation side-channel for the data values selected as an address. In principle, in an advanced out-of-order processor, in any code sequence of the form:

```
STR X1, [X2]
...
LDR X3, [X4] ; X4 contains the same address as X2
<arbitrary data processing of X3>
LDR X5, [X6, X3]
``` then the second load in this sequence might be performed speculatively, using a value for X3 that was derived from the speculatively value returned in X3 from the first load. That speculatively loaded value could be taken from a value held at the first address that was from earlier in the execution of the program than the STR that overwrote that value. Any cache allocation generated by the speculative execution of the second load will reveal some information about this earlier data speculatively loaded into X3. This could be used by an attacker to circumvent situations where a store is overwriting some earlier data in order to prevent the discovery of that value. This speculative bypassing approach be extended through a chain of speculative loads such that in this case

```
STR X1, [X2]
...
LDR X3, [X4] ; X4 contains the same address as X2
<arbitrary data processing of X3>
LDR X5, [X6, X3]
<arbitrary data processing of X5>
LDR X7, [X8, X5]
``` then the second and third loads in this sequence might be performed speculatively, using a value for X3 that has been taken from a value held at the first address that was from earlier in the execution than the STR that overwrote that value. Any cache allocation generated by the speculative execution of the third load will reveal some information about the data in X5. In this case, if an attacker has control of the previous value held at the address pointed to be X2 and X4, then it can influence the subsequent speculation, allowing the selection of data by the second speculative load, and the revealing of the selected data by examination of the cache allocations caused by the third load.

Where the store and the first load are to the same virtual and physical address, this sort of speculative re-ordering can only occur within a single exception level.

Where the store and the first load are to different virtual addresses, but to the same physical address, the speculative re-ordering can occur between code at different exception levels, such that in this case:

```
STR X1, [X2]
...
ERET ; exception return to a lower level
...
LDR X3, [X4] ; X4 contains a different virtual address as X2, but the same physical address
<arbitrary data processing of X3>
LDR X5, [X6, X3]
```

The location loaded speculatively into the cache using X3 as an offset can be indicative of the previous data value that was at the physical address pointed to by X2 and X4.

In modern high-performance processors, it is relatively straightforward to exhibit the reordering of a store and a subsequent load to the same address, and the speculative reading of older data by such a load, if the address of the store is delayed in its availability, for example as a result of a cache miss in the generation of the store address, relative to the availability of the address of the load.

Where the store and the load use the same registers to convey the address, the processor will not commonly speculatively execute a load ahead an earlier store to the same address. However, in some micro-architecturally specific cases, it is in principle possible on some implementations. The exact conditions for this re-ordering is typically a complex function of the delays of previous memory accesses being handled by the processor.

A particular concern of this mechanism would be where the Store and the first Load are accesses onto the stack (either using the stack pointer or other registers that have the same addresses), as this is a relatively common pattern in code. In principle, this could provide a mechanism by which an earlier value that was on the stack, but has been overwritten, will control the subsequent speculation of the processor. For a privileged stack, the earlier value that was on the stack might actually be under the control of less privileged execution.

In the following sequence:

```
STR X1, [SP]
...
LDR X3, [SP]
<arbitrary data processing of X3>
LDR X5, [X6, X3]
<arbitrary data processing of X5>
LDR X7, [X8, X5]
``` this could then give a control channel for less privileged code having determined the value that was held on the stack before the store (perhaps as a result of a system call requesting the processing of some data) to direct the speculative load of data anywhere in the more privileged address space addresses of the processor using the second load. The result of that second load is then made observable by the fact it is used to form the address of the third load, which causes a cache allocation. The presence of that cache allocation can be detected by a classic cache timing analysis, in the same way as applies to all these side channels. In principle, this could allow the reading of arbitrary privileged data by less privileged code using the timing side-channel.

Similarly the stack could be reused with a function pointer so allowing the selection of arbitrary code to be run speculatively in the more privileged address space, as shown in this example:

```
STR X1, [SP]
...
LDR X3, [SP]
...
BLR X3.
```

In principle, this would allow the selection of a speculation gadget to reveal interesting data.

A further form of this behavior that might be exhibited on at least some implementations is where an out-of-order processor can have a load speculatively return data from a later store in the instruction stream, as might be seen in this sequence:

```
...
LDR X3, [X4]
<arbitrary data processing of X3>
LDR X5, [X6, X3]
...
STR X1, [X2] ; X2 contains the same address as X4
```

Where this occurs, the allocations in the cache by the second load could give rise to the observation of the later stored value by the use of the cache timing side-channel.

A simple proof of concept has been demonstrated on some implementations, where the store has its address delayed relative to a later load to the same address, leading to later speculative memory accesses of the type described above. Those speculative memory accesses cause allocations in the cache that can, using timing side channels, reveal the value of data selected by the determination of the earlier value held in the memory location being stored to and loaded from. This was demonstrated using bespoke code to prove the concept.

The more general case of this form of bypassing, particularly where the store address is available before, or at the same time as, the load address, as typically occurs when accessing the stack, has not been demonstrated, and it would be very hard for user code to guarantee the necessary complex conditions for delaying previous memory accesses to cause the processor to the necessary re-ordering to leak such data. However, it is not possible to rule out that this mechanism might be exploitable as a low bandwidth channel to read the data from more privileged memory.

The mechanism of observing a later store by a load has not been demonstrated but is believed to be possible on at least some implementations.

Two store-speculation barrier instructions can be provided for mitigating against such attacks: SSBB and PSSBB. Use of the SSBB barrier ensures that any stores before the SSBB using a virtual address will not be bypassed by any speculative executions of a load after the SSBB to the same virtual address. The SSBB barrier also ensures that any loads before the SSBB to a particular virtual address will not speculatively load from a store after the SSBB. This barrier can be used to prevent the speculative loads being exploited using this mechanism in cases of software managed privilege within an exception level. Use of the PSSBB barrier ensures that any stores before the PSSBB using a particular physical address will not be bypassed by any speculative executions of a load after the PSSBB to the same physical address. The PSSBB barrier also ensures that any loads before the PSSBB to a particular physical address will not speculatively load from a store after the PSSBB.

Figure 4:
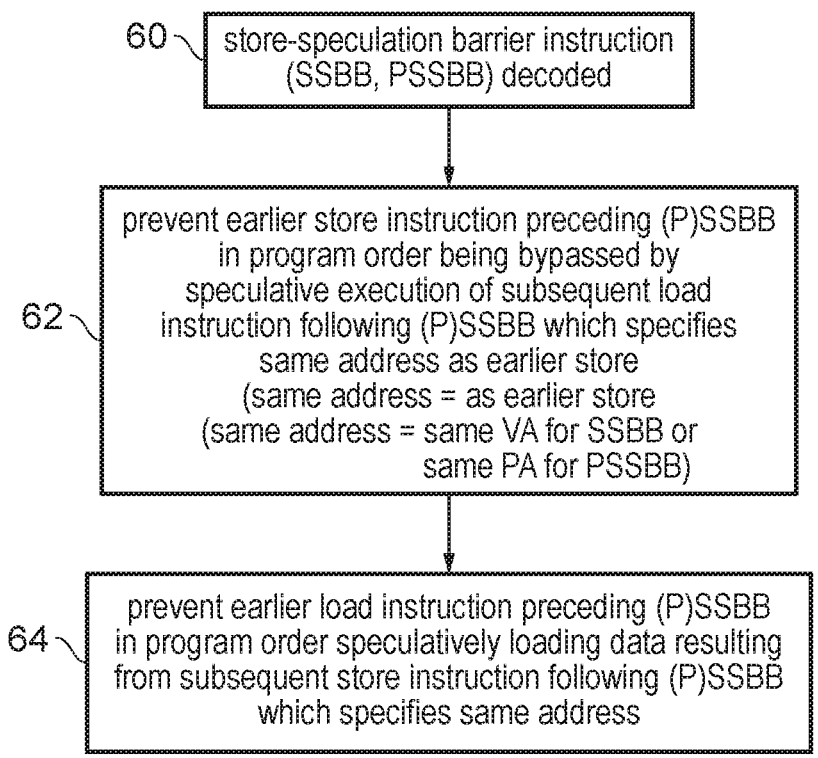
FIG. 4 shows a method of processing a store-speculation barrier instruction.

FIG. 4 shows a method of processing the store-speculation barrier instruction, which could be either the SSBB or PSSBB instructions described above. At step 60 such a store-speculation barrier instruction is decoded. At step 62 the instruction decoder 10 controls the processing pipeline to prevent an earlier store instruction preceding the store-speculation barrier instruction in the program order from being bypassed by speculative execution of a subsequent load instruction which follows the store-barrier instruction in the program order and which specifies the same address as the earlier store. For the SSBB instruction, "same address" refers to the same virtual address, while for the PSSBB instruction, "same address" refers to the same physical address.

Also, at step 64, in response to the store-speculation barrier instruction the instruction decoder controls subsequent stages of the pipeline to prevent an earlier load instruction which precedes the store-speculation barrier instruction in program order speculatively loading data resulting from a subsequent store instruction which follows the store-speculation barrier instruction in program order and specifies the same address (again the "same address" could be a virtual address or a physical address depending on whether the SSBB or PSSBB variant is decoded). Hence, this barrier enables compilers or programmers to provide protection against speculation side-channel attacks.

Another example of speculation is the prediction of the outcome (taken or not-taken) are the conditional branch instruction by the branch predictor 4, which may then lead to speculative execution of subsequent instructions depending on the prediction. Branches are typically speculated in high-performance CPU micro-architecture designs. In order to speculate with high-accuracy, a prediction table is generated that predicts whether to take or not take a branch based on previous executions of that branch.

It is proposed to provide uni-directional branches, i.e. branches for which speculation only occurs in one-direction, either taken or not-taken, but not both. Such uni-directional branches could be supported in the instruction set architecture in addition to bi-directional branches for which speculation is allowed in both directions (taken and not-taken).

Consider the following example of high-level code:

```
<pseudo-code>
if a < b {
// sensitive code, do not speculate into here.
}
// non-sensitive code
</pseudo-code>
```

This would normally translate into a sequence of instructions to be executed on the processing pipeline, such as:

```
<psuedo-asm>
cmp a, b
b.ge nonsensitive_code
sensitive_code:
; something sensitive here.
nonsensitive_code:
</pseudo-asm>
```

If normally (a<b) holds true, then eventually a predictor will predict with a high-confidence that a<b and may speculate that the sensitive code should be executed. This can lead to side-channel timing attacks such as those described above.

If however we provide the following code:

```
<psuedo-asm>
cmp a, b
bpt.ge nonsensitive_code
sensitive_code:
; something sensitive here.
nonsensitive_code:
</pseudo-asm>
```

Where "bpt" is an assembly mnemonic for "branch-only-predict-taken", then the micro-architecture can only use the branch predictor to speculate when it has a high-confidence that the branch will be taken. If it had insufficient confidence in the taken prediction, or high confidence in the not-taken prediction, then the predictor could stall execution until the branch is resolved. This would prevent speculation into the sensitive code region. The orthogonal approach of bpn (branch-only-predict-not-taken) could guard prediction in the other direction.

The micro-architect has a number of choices to handle these branches. Either they can use a normal branch predictor and continue to build the history, but only use that history if it is confident in the allowed direction of prediction, or these branches can be excluded from prediction altogether. A third form of branch bnv, (branch-never-predict), could also be supported, which would never be predicted.

Figure 5:
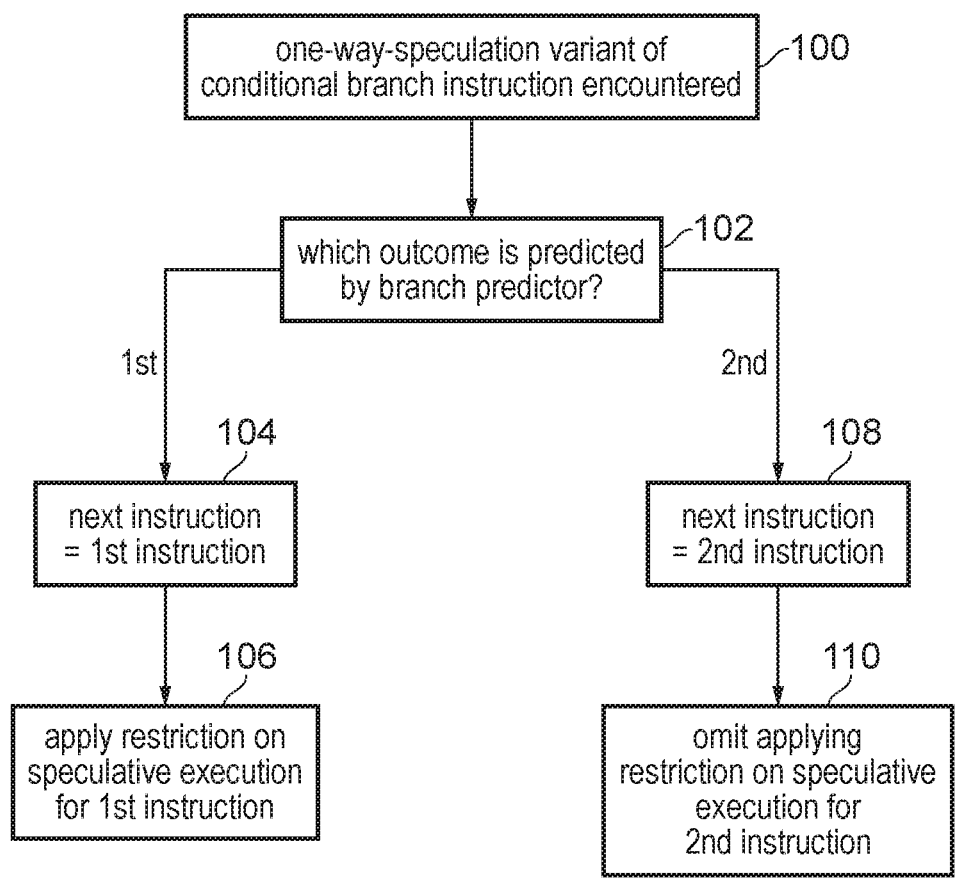
FIG. 5 illustrates a method of processing a one-way-speculation variant of a conditional branch instruction.

Hence, FIG. 5 shows methods of processing such a one-way-speculation variant of a conditional branch instruction. At step 100 the processing pipeline encounters the one-way-speculation variant of the conditional branch instruction. The one-way-speculation variant could be identified in different ways. In some cases the fetch stage 6 may be able to identify the one-way speculation variant of the conditional branch instruction directly, for example by partially decoding the instruction or by accessing pre-decode information which may have been added to the instruction by a pre-decoder which may analyse instructions as they are allocated into the instruction cache 8. In another example, when branch instructions are decoded by the instruction decoder 10, if a branch is identified as the one-way-speculation variant of the conditional branch instruction, this may be signalled back to the branch predictor 4, which may then update a corresponding entry of branch prediction state that the instruction at a given instruction address has been detected as being a conditional branch instruction of the one-way-speculation variant. This could allow the fetch stage 6 on subsequent fetching of the same instruction to identify from the stored branch prediction state that the instruction is the one-way-speculation variant even if it does not itself have any ability to decode the instruction.

In response to the one-way-speculation variant, at step 102 the branch predictor 4 determines which branch outcome is predicted. If the outcome is a first outcome (which could be either the taken or not-taken outcome) then at step 104 the branch predictor 4 predicts that the next instruction to be executed following the branch should be a first instruction. If the first outcome is the taken outcome, then the first instruction is the instruction at the branch target address of the branch instruction, while if the first outcome is the not-taken outcome then the first instruction is the next instruction following sequentially from the conditional branch. At step 106, a restriction speculative execution is applied to the first instruction. For example, the first instruction could be prevented from being executed speculatively, or could be allowed to be executed speculatively but with a restriction on updates to a cache structure based on the speculative execution, to prevent an attacker being abler to derive information from cache timing side channel attacks.

On the other hand, if at step 102 the second outcome is predicted (the second outcome is the opposite outcome from the first outcome), then at step 108 the next instruction is predicted to be a second instruction (again, the next sequential instruction if the second outcome is not-taken or the instruction at the branch target address if the second outcome is taken). At step 110, the restriction speculation (which would be applied at step 106 for the first outcome) is instead omitted for the second instruction, so that speculative execution of the second instruction may proceed unrestricted.

Hence, with the one-way branch described here, this enables speculation to continue when the second outcome is predicted, to improve performance, but restricts speculation in the case when the first outcome is predicted to protect against attacks of the form described above. Some implementations may support only a single variant of the one-way-branch, e.g. either bpt or bpn described above (for bpt the first outcome in FIG. 5 is the not-taken outcome and the second outcome is the taken outcome, and for bpn the first outcome is the taken outcome and the second outcome is the not-taken outcome). Other implementations may support both bpt and bpn. This can allow the programmer or compiler to select the appropriate variant depending on whether the code to be executed following the taken or not-taken outcome is most vulnerable to loss of sensitive information. Also, some systems may also support a no-speculation variant where the restriction on speculation is always applied regardless of whether the predicted outcome or the first or second outcome.

Further examples are set out in the following clauses:
1. An apparatus comprising: processing circuitry to perform data processing; instruction decoding circuitry to decode instructions to control the processing circuitry to perform the data processing; in which: the instruction decoding circuitry is responsive to a conditional speculation barrier instruction.
2. A computer program for controlling a host processing apparatus to provide an instruction execution environment for executing instructions of target program code, the computer program comprising: instruction decoding program logic to decode instructions of the target program code to control the processing program logic to perform data processing; in which: the instruction decoding program logic is responsive to a conditional speculation barrier instruction.
3. A data processing method comprising: decoding a conditional speculation barrier instruction; and in response to decoding of the conditional speculation barrier instruction, controlling processing circuitry.

Figure 6:
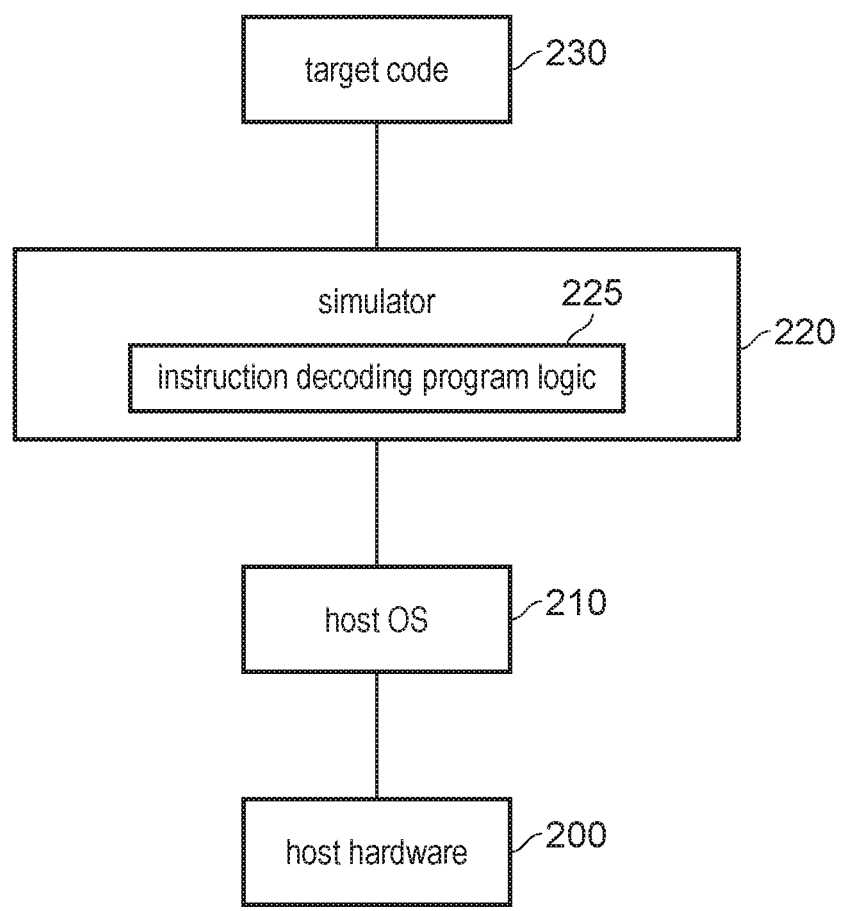
FIG. 6 illustrates a simulator example which may be used.

FIG. 6 illustrates a simulator implementation that may be used. While the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 200, optionally running a host operating system 210, supporting the simulator program 220. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 200), some simulated embodiments may make use of the host hardware, where suitable.

The simulator program 220 may be stored on a computer-readable storage medium (which may be a non-transitory medium), and provides a program interface (instruction execution environment) to the target code 230 (which may include applications, operating systems and a hypervisor) which is the same as the application program interface of the hardware architecture being modelled by the simulator program 220. Thus, the program instructions of the target code 230, including speculation barrier instructions, store-speculation barrier instructions and one-way-speculation forms of the conditional branch instruction discussed above, may be executed from within the instruction execution environment using the simulator program 220, so that a host computer 200 which does not actually have the hardware features of the apparatus 2 discussed above can emulate these features. The simulator program 220 may include instruction decoding program logic 225 for decoding instructions of the target code 230 and mapping them to corresponding functionality executed using one or more instructions from the native instruction set supported by the host hardware 200.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
processing circuitry to perform data processing; and
instruction decoding circuitry to decode instructions to control the processing circuitry to perform the data processing;
in which:
the instruction decoding circuitry is responsive to a speculation barrier instruction to control the processing circuitry to prevent a subsequent operation, appearing in program order after the speculation barrier instruction, that has an address dependency on an earlier instruction preceding the speculation barrier instruction in the program order, from speculatively influencing allocations of entries in a cache, and
the processing circuitry is configured to permit speculative execution of conditional instructions following the speculation barrier instruction unless they use results of a data value prediction or condition code prediction of the earlier instruction when the earlier instruction has not yet been architecturally resolved.

2. The apparatus according to claim 1, in which said subsequent operation is one of a load instruction and a store instruction.

3. The apparatus according to claim 1, in which said earlier instruction is a load instruction.

4. The apparatus according to claim 1, in which said cache is one of:
a data cache;
an instruction cache; and
a branch prediction cache.

5. The apparatus according to claim 1, in which the processing circuitry is configured to prevent said subsequent operation from speculatively influencing allocations of entries in the cache while permitting speculative execution of said subsequent operation.

6. The apparatus according to claim 1, in which the processing circuitry is configured to prevent said subsequent operation from speculatively influencing allocations of entries in the cache by preventing speculative execution of said subsequent operation, until the speculation barrier instruction completes.

7. The apparatus according to claim 1, in which in response to the speculation barrier instruction, the instruction decoding circuitry is configured to control the processing circuitry to prevent the subsequent instruction being speculatively executed using at least one of:
the data value prediction for the earlier instruction;
the condition code prediction for the earlier instruction when the earlier instruction is an instruction other than a conditional branch instruction; and when the earlier instruction is a vector instruction dependent on predicate information indicative of which data elements of a vector value are active elements, a prediction of said predicate information.

8. The apparatus according to claim 1, in which the processing circuitry is configured to permit speculative control of control flow of instructions following the speculation barrier instruction based on a prediction associated with an architecturally unresolved earlier instruction preceding the speculation barrier instruction.

9. The apparatus according to claim 1, in which in response to a store-speculation barrier instruction, the instruction decoding circuitry is configured to prevent an earlier store instruction preceding the store-speculation barrier instruction in the program order being bypassed by speculative execution of a subsequent load instruction following the store-speculation barrier instruction in the program order which specifies the same address as the earlier store instruction.

10. The apparatus according to claim 9, in which in response to the store-speculation barrier instruction, the instruction decoding circuitry is configured to prevent an earlier load instruction preceding the store-speculation barrier instruction in the program order speculatively loading data resulting from a subsequent store instruction following the store-speculation barrier instruction in the program order which specifies the same address as the earlier load instruction.

11. The apparatus according to claim 9, in which for a first variant of the store-speculation barrier instruction, the subsequent load instruction specifies the same virtual address as the earlier store instruction.

12. The apparatus according to claim 9, in which for a second variant of the store-speculation barrier instruction, the subsequent load instruction specifies the same physical address as the earlier store instruction.

13. An apparatus comprising:
processing circuitry to perform data processing; and
instruction decoding circuitry to decode instructions to control the processing circuitry to perform the data processing;
in which:
the instruction decoding circuitry is responsive to a speculation barrier instruction to control the processing circuitry to prevent a subsequent operation, appearing in program order after the speculation barrier instruction, that has an address dependency on an earlier instruction preceding the speculation barrier instruction in the program order, from speculatively influencing allocations of entries in a cache, and
until the speculation barrier instruction completes:
when a load, store, data, or instruction preload operation appears in the program order after the speculation barrier instruction, and the load, store, data, or instruction preload operation has an address dependency on a result of a conditional select instruction, where:
the conditional select instruction has a register data dependency on a load that has been executed speculatively for one of its input registers, and
the conditional select instruction does not have a register dependency on the load that has been executed speculatively for its other input register, and
the condition for the conditional select instruction is such that the input that is not dependent on the load that has been executed speculatively is selected if the load that has been executed speculatively is not architecturally executed, then the processing circuitry is configured to prevent the load, store, data, or instruction preload operation influencing allocations of entries in the cache in a way that can be used to determine any part of a value of a speculatively loaded value from the load that has been executed speculatively by an evaluation of which entries in the cache have been allocated or evicted.

14. An apparatus comprising:
processing circuitry to perform data processing; and
instruction decoding circuitry to decode instructions to control the processing circuitry to perform the data processing:
in which:
the instruction decoding circuitry is responsive to a speculation barrier instruction to control the processing circuitry to prevent a subsequent operation, appearing in program order after the speculation barrier instruction, that has an address dependency on an earlier instruction preceding the speculation barrier instruction in the program order, from speculatively influencing allocations of entries in a cache, and
until the speculation barrier instruction completes:
when a load, store, data, or instruction preload operation appears in the program order after the speculation barrier instruction, and the load, store, data, or instruction preload operation has an address dependency on a result of a conditional move instruction, where:
the conditional move instruction does not have a register dependency on a load that has been executed speculatively for its input register, and
the condition for the conditional move instruction is such that the condition passes if the load that has been executed speculatively is not architecturally executed, then the processing circuitry is configured to prevent the load, store, data, or instruction preload operation influencing allocations of entries in the cache in a way that can be used to determine any part of a value of a speculatively loaded value from the load that has been executed speculatively by an evaluation of which entries in the cache have been allocated or evicted.

15. A non-transitory, computer-readable storage medium storing a computer program, which when executed by one or more hardware processors, control a host processing apparatus to provide an instruction execution environment for executing instructions of target program code, the computer program comprising:
instruction decoding program logic to decode instructions of the target program code to control processing program logic to perform data processing;
in which:
the instruction decoding program logic is responsive to a speculation barrier instruction to prevent a subsequent operation, appearing in program order after the speculation barrier instruction, that has an address dependency on an earlier instruction preceding the speculation barrier instruction in the program order, from speculatively influencing allocations of entries in a cache, and
the instruction execution environment is configured to permit speculative execution of conditional instructions following the speculation barrier instruction unless they use results of a data value prediction or condition code prediction of the earlier instruction when the earlier instruction has not yet been architecturally resolved.

16. A data processing method comprising:

decoding a speculation barrier instruction;

in response to decoding of the speculation barrier instruction, controlling processing circuitry to prevent a subsequent operation, appearing in program order after the speculation barrier instruction, that has an address dependency on an earlier instruction preceding the speculation barrier instruction in the program order, from speculatively influencing allocations of entries in a cache; and the processing circuitry permitting speculative execution of conditional instructions following the speculation barrier instruction unless they use results of a data value prediction or condition code prediction of the earlier instruction when the earlier instruction has not yet been architecturally resolved.

* * * * *